(12) United States Patent
Yasuzaki

(10) Patent No.: US 12,413,678 B2
(45) Date of Patent: Sep. 9, 2025

(54) IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Koji Yasuzaki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 18/506,363

(22) Filed: Nov. 10, 2023

(65) Prior Publication Data

US 2024/0163384 A1   May 16, 2024

(30) Foreign Application Priority Data

Nov. 11, 2022 (JP) ................................. 2022-181275
Sep. 27, 2023 (JP) ................................. 2023-164921

(51) Int. Cl.
*H04N 1/00* (2006.01)
*G06F 3/12* (2006.01)

(52) U.S. Cl.
CPC ....... *H04N 1/00652* (2013.01); *G06F 3/1219* (2013.01); *G06F 3/1259* (2013.01)

(58) Field of Classification Search
None
See application file for complete search history.

(56) References Cited

U.S. PATENT DOCUMENTS

| | | | |
|---|---|---|---|
| 8,721,022 B2 | 5/2014 | Izawa et al. | |
| 2006/0269339 A1* | 11/2006 | Okamoto | G03G 15/6564 399/401 |
| 2009/0255971 A1* | 10/2009 | Nakamaki | B41J 15/16 226/1 |
| 2017/0123366 A1* | 5/2017 | Tajiri | G03G 15/6558 |
| 2022/0276602 A1* | 9/2022 | Matsumoto | H04N 1/00652 |
| 2023/0046301 A1* | 2/2023 | Yamamoto | B65H 29/125 |
| 2023/0047171 A1* | 2/2023 | Sakamoto | G03G 15/6573 |

FOREIGN PATENT DOCUMENTS

| | | |
|---|---|---|
| EP | 3 257 674 A1 | 12/2017 |
| EP | 4 064 026 A1 | 9/2022 |
| JP | 2012-200976 A | 10/2012 |
| JP | 2020-0166571 A | 10/2020 |

OTHER PUBLICATIONS

Extended European Search Report dated Apr. 15, 2024, in European Patent Application No. 23206608.4.

* cited by examiner

*Primary Examiner* — Fan Zhang
(74) *Attorney, Agent, or Firm* — Venable LLP

(57) ABSTRACT

An image forming apparatus, a control method of the image forming apparatus, and a storage medium can suppress occurrence of a wasteful operation and perform a rewinding operation of an optimal amount. To this end, after stop of printing by the image forming apparatus, a print status at print start is obtained, and a rewinding distance of a roll paper is set based on the obtained print status. Then, a paper conveyance unit performs rewinding conveyance (reverse rotation conveyance) based on the set rewinding distance.

17 Claims, 14 Drawing Sheets

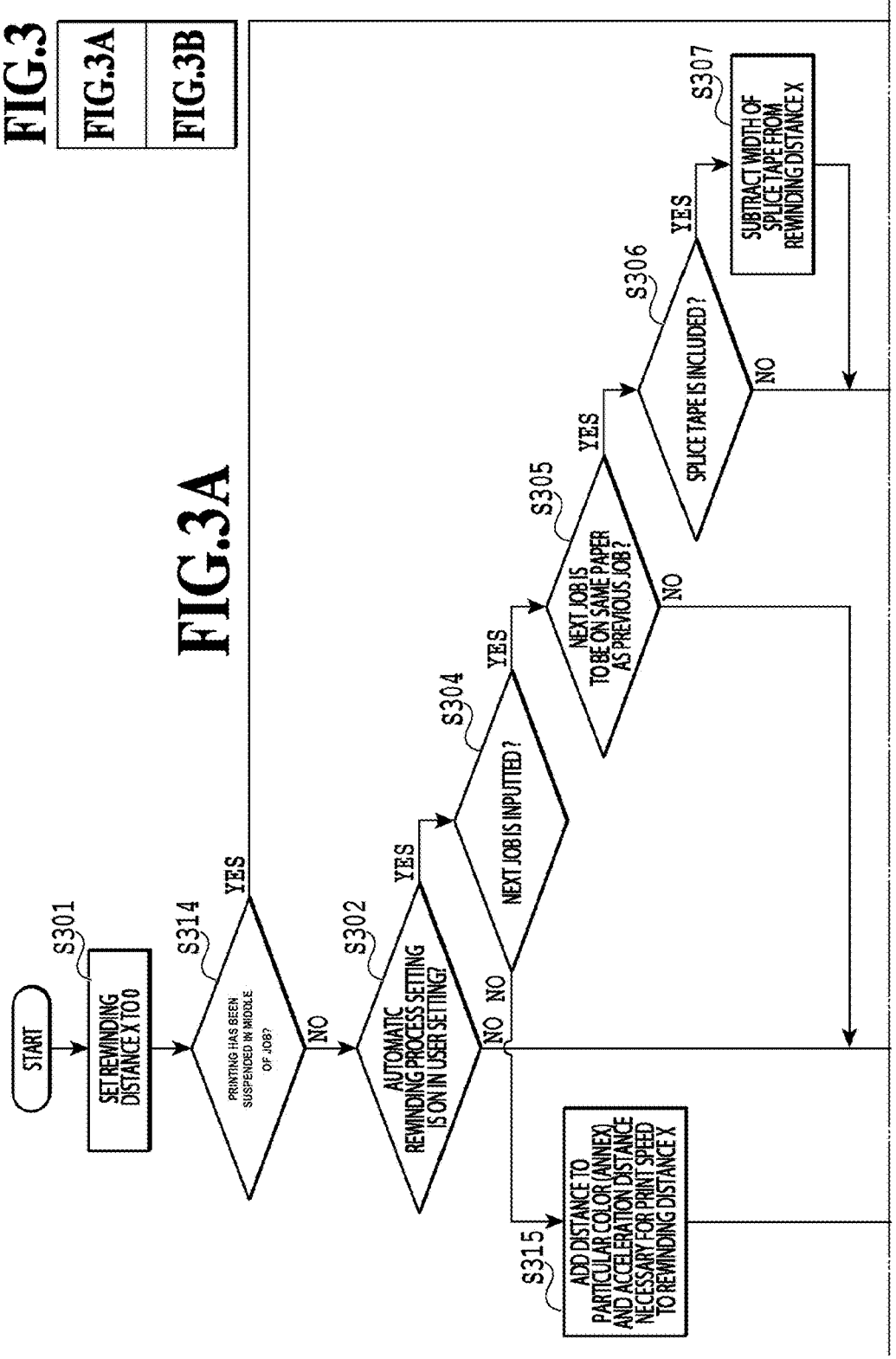

| | | | JOB LIST | | | | |
|---|---|---|---|---|---|---|---|
| JOB ID | PAPER TYPE | PAPER WIDTH (mm) | PRINT COLOR | PRINT SPEED (m/min) | RESOLUTION | NUMBER OF FILES | NUMBER OF PAGES |
| ID0001 | HIGH-QUALITY PAPER | 150 | C/M/Y/K | 60 | 1200dpi | 3 | 100 |
| ID0002 | HIGH-QUALITY PAPER | 150 | C/M/Y/K | 60 | 1200dpi | 2 | 200 |
| ID0003 | FILM | 200 | C/M/Y/K/W | 20 | 1200dpi | 1 | 50 |
| ID0004 | FILM | 200 | C/M/Y/K/W | 20 | 1200dpi | 2 | 350 |
| ID0005 | FILM | 200 | C/M/Y/K | 20 | 1200dpi | 1 | 400 |
| ID0006 | PET | 200 | C/M/Y/K | 10 | 1200dpi | 1 | 176 |
| ID0007 | PLAIN PAPER | 300 | C/M/Y/K | 40 | 600dpi | 2 | 500 |

FIG. 7

IMAGE FORMING APPARATUS, CONTROL METHOD OF IMAGE FORMING APPARATUS, AND STORAGE MEDIUM

BACKGROUND OF THE INVENTION

Field of the Invention

The present invention relates to an image forming apparatus, a control method, and a storage medium.

Description of the Related Art

In a general image forming apparatus that performs image forming on a continuous paper (hereinafter, roll paper), the image forming is performed while the roll paper is conveyed at constant speed. In the case where the image forming is stopped, the roll paper is conveyed by some degree due to an action of inertia or the like and is then stopped. The stop of image forming includes stop at job completion and suspension in middle of a job. In the suspension in middle of a job, a portion that has been conveyed by a predetermined amount in the stop is in a blank state because no image forming is performed, and the roll paper needs to be rewound by a predetermined amount in the case where the image forming is to be restarted.

Japanese Patent Laid-Open No. 2012-200976 discloses a technique in which, in printing of pictures, a timing mark is printed for each picture and this timing mark is used to align a roll paper. Specifically, after printing stop, a printer conveys the roll paper in a reverse direction while detecting the timing marks, and aligns the roll paper at a position in consideration of also a runway length to allow the next picture to be printed at normal forward feeding speed from a position successive to the last printed picture. This can reduce wasted paper due to a blank portion.

The reverse rotation conveyance is unnecessary in some cases depending on a status at the printing stop. However, since the reverse rotation conveyance is always performed in the case of the printing stop in Japanese Patent Laid-Open No. 2012-200976, a wasteful operation is sometimes performed in the printing operation.

Moreover, in the case where the rewinding (reverse rotation conveyance) is necessary, the suitable rewinding distance varies depending on printing conditions of the next job. Also in this case, since the fixed reverse rotation conveyance is performed in Japanese Patent Laid-Open No. 2012-200976, the next printing cannot be started from the suitable position in some cases.

SUMMARY OF THE INVENTION

Accordingly, the present invention provides an image forming apparatus, a control method of an image forming apparatus, and a storage medium that allow image forming to be resumed at a suitable position with respect to a roll paper.

An image forming apparatus of the present invention includes: an image forming unit that forms an image on a print medium; a feeding unit that feeds the print medium in a forward direction in an image forming operation by the image forming unit and that rewinds the print medium in a reverse direction opposite to the forward direction after stop of the image forming operation; a control unit that controls the image forming unit and the feeding unit; and an obtaining unit that obtains a status at time of resuming of the image forming operation by the image forming unit in a case where the image forming operation by the image forming unit is stopped, in which after the stop of the image forming operation by the image forming unit, the control unit rewinds the print medium in the reverse direction based on the status, and resumes image forming from a region on the feeding unit side of a region in which the image is formed by the image forming unit in the print medium.

The present invention can provide an image forming apparatus, a control method of an image forming apparatus, and a storage medium that allow image forming to be resumed at a suitable position with respect to a roll paper.

Further features of the present invention will become apparent from the following description of exemplary embodiments with reference to the attached drawings.

BRIEF DESCRIPTION OF THE DRAWINGS

FIG. 7 is a diagram illustrating a screen of a job list;

DESCRIPTION OF THE EMBODIMENTS

An embodiment of the present invention is described below with reference to the drawings.

Figure 1:
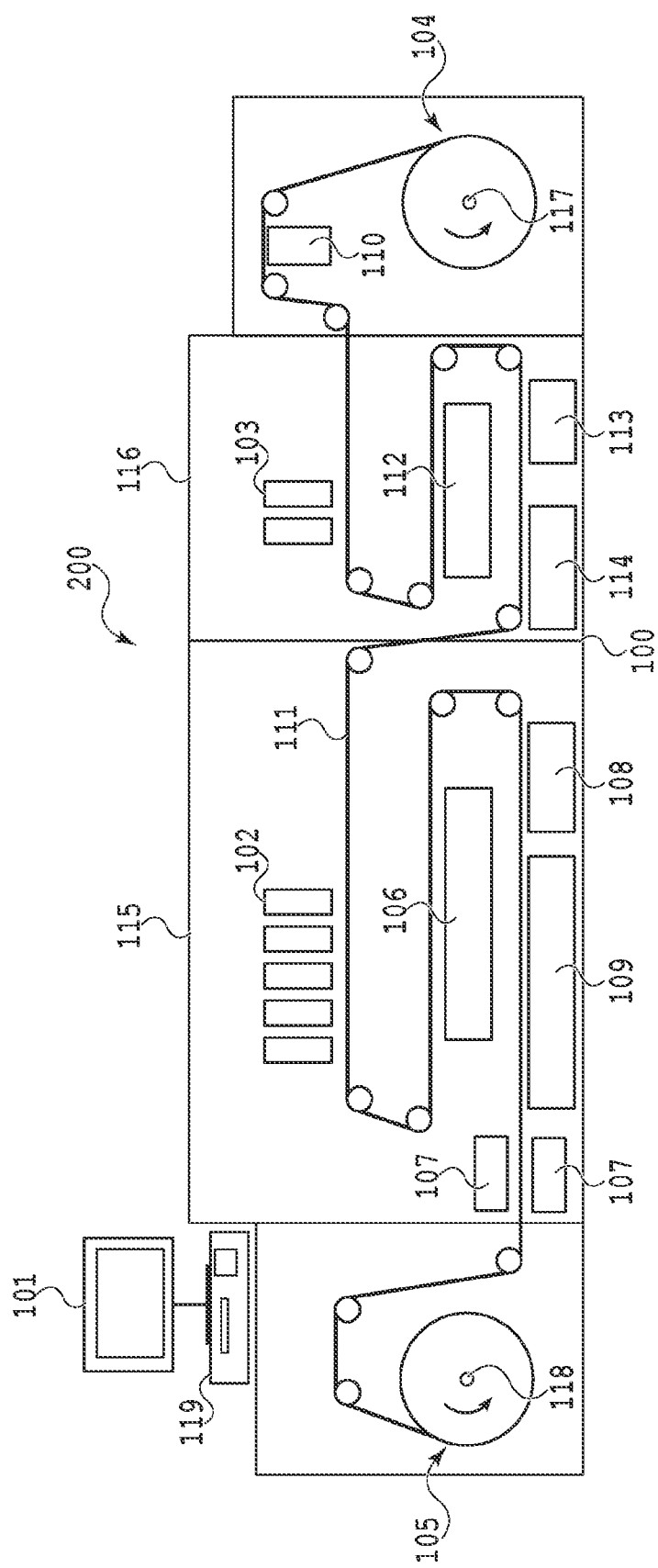
FIG. 1 is a diagram illustrating an example of an apparatus configuration of an image forming system.

FIG. 1 is a diagram illustrating an example of an apparatus configuration of an image forming system 200 according to the present embodiment. An image forming apparatus 100 forms an image on a continuous paper (hereinafter, roll paper) being a print medium that is used in the present embodiment and on which continuous image forming is possible. In the present embodiment, the image forming apparatus 100 includes a paper feed device 104 that conveys the roll paper 111, an annex 116 in which particular color printing is performed, a main section 115 in which basic color printing is performed, a paper discharge device 105 that performs winding of the roll paper 111, and an UI operation panel 101. Note that the paper feeding device 104 may be a feeding device and the paper discharge device may be a winding device.

The paper feed device 104 feeds the roll paper 111. The paper feed device 104 rotates a paper pipe of the roll paper 111 about a rotation shaft 117 to convey the roll paper 111 wound around the paper pipe toward the annex 116 via multiple rollers (conveyance rollers, paper feed roller, and the like) at constant speed. The paper discharge device 105 winds the roll paper 111 conveyed from the main section 115 about a paper pipe into a roll shape. For example, as illustrated in FIG. 1, in the paper discharge device 105, the roll paper 111 is wound on the paper pipe of a rotation shaft 118, and is held in the roll shape. In the paper feeding device 104, the rotation shaft 117 is rotated in a forward direction to send out the sheet, and is rotated in a reverse direction to rewind the sheet. In the paper discharge device 105, the rotation shaft 118 is rotated in the forward direction to wind the sheet, and is rotated in the reverse direction to send out the sheet. Conveyance rollers are also rotated in the forward direction to convey the sheet toward the paper discharge device 105, and is rotated in the reverse direction to convey the sheet toward the paper feeding device 104.

The paper discharge device 105 rotates the paper pipe about the rotation shaft 118 to wind the roll paper 111 conveyed to the paper pipe via multiple rollers (for example, conveyance rollers and paper discharge roller), on the rotation shaft 118 at constant speed as a finished product of the roll paper. Before start of printing, the roll paper 111 is passed from the paper feed device 104 to the paper discharge device 105. The roll paper 111 is set in the paper feed device 104, and a leading edge of the roll paper 111 is passed above a skew correction device 110. Then, the roll paper 111 is passed below a printing device 103 in the annex 116.

The printing device 103 in the present embodiment performs printing of a particular color (for example, white ink or the like) other than basic colors (CMYK) in the printing. In the annex 116 in which the printing device 103 is arranged, the roll paper 111 is passed above a drying device 112, and passed above cooling devices 113 and 114. Then, the roll paper 111 is passed below a printing device 102 of the main section 115, passed above a drying device 106, and passed above cooling devices 108 and 109.

The printing device 102 in the present embodiment performs printing in the printing basic colors (CMYK). In the main section 115 in which the printing device 102 is arranged, the roll paper 111 is sent toward the paper discharge device 105 in a forward direction via a connection scanner device 107.

Although a configuration in which the roll paper 111 fed from the paper feed device 104 is conveyed to the main section 115 via the annex 116 is described in the present embodiment, the configuration is not limited to this. Specifically, the configuration may be such that the main section 115 is provided upstream of the annex 116 to allow the roll paper 111 to be conveyed to the annex 116 via the main section 115. Main conveyance rollers 120 have drive sources. One of the main conveyance rollers 120 performs conveyance in printing of the printing device 103 that performs CMYK printing, and the other main conveyance roller 120 performs conveyance in printing of the printing device 102 that performs printing of a particular color such as white. The rollers having drive sources are arranged to enable accurate conveyance in printing.

In the case where the printing is performed, the roll paper 111 is passed inside the image forming system 200, and then a print job is inputted into a control PC 119 of the image forming system 200. After the print job input, a print start button is pressed in the UI operation panel 101 to start the printing.

Figure 2:
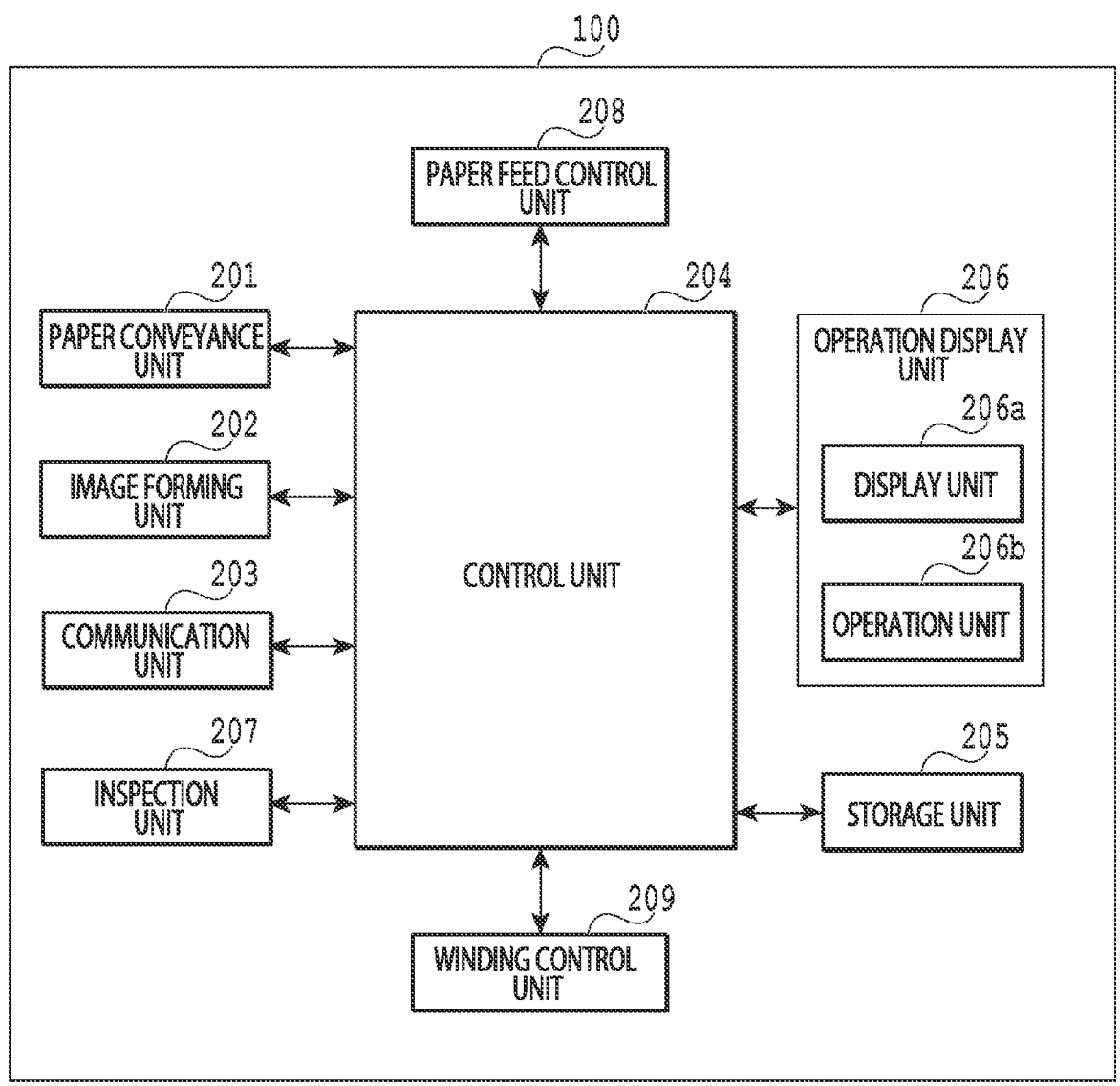
FIG. 2 is a functional block diagram illustrating a control configuration of an image forming apparatus.

FIG. 2 is a functional block diagram illustrating a control configuration of the image forming apparatus 100. The image forming apparatus 100 includes, for example, a paper conveyance unit 201, an image forming unit 202, a communication unit 203, a control unit 204, a storage unit 205, an operation display unit 206, an inspection unit 207, a paper feed control unit 208, and a winding control unit 209.

The paper conveyance unit 201 performs conveyance control of the roll paper 111 inside the image forming apparatus 100. The paper feed control unit 208 controls paper feed of the roll paper 111 by the paper feed device 104. Moreover, the paper feed control unit 208 can perform rewinding control (reverse rotation conveyance control) after job printing. The image forming unit 202 controls printing operations of the printing devices 102 and 103 based on received print data.

The communication unit 203 is formed of a communication control card such as, for example, a local area network (LAN) card. The communication unit 203 exchanges various pieces of data with an external apparatus (control PC) connected to a communication network such as a LAN or a wide area network (WAN).

The control unit 204 is formed of, for example, a central processing unit (CPU), a random access memory (RAM), and the like. The CPU of the control unit 204 reads various programs such as a system program and a processing program stored in the storage unit 205 to load the programs onto the RAM, and executes various processes according to the loaded programs. For example, the control unit 204 can perform an image forming process of executing an image forming job (hereinafter, simply referred to as job) in response to an instruction of a user.

The storage unit 205 is formed of, for example, a non-volatile semiconductor memory (so-called flash memory), a hard disk drive (HDD), or the like. The various programs such as the system program and the processing program executed in the control unit 204 and various pieces of data necessary for execution of these programs are stored in the storage unit 205.

The operation display unit 206 is formed of, for example, a liquid crystal display (LCD) with a touch panel, and includes a display unit 206a and an operation unit 206b. The display unit 206a displays various pieces of information on a display screen in the UI operation panel 101, according to display control signals received from the control unit 204. The operation unit 206b receives various input operations made by the user on various operation keys such as numerical keys and a start key displayed on the UI operation panel 101, and outputs operation signals to the control unit 204. The operation display unit 206 is used, for example, in setting of job information and the like in the case where the job is executed. The user can arbitrarily set any of the following conditions: paper to be used; information on print speed; the number of pages to be printed; the number of copies to be printed; a print length; a print weight; and a print diameter.

The inspection unit 207 performs control of checking printing states of the printing devices. The inspection unit 207 causes the printing devices 102 and 103 to print a pattern for ejection failure inspection, reads a print result with a scanner in the connection scanner device 107, and checks whether there is an ejection failure in the printing device 102 or 103. In the case where the inspection unit 207 confirms an ejection failure, the inspection unit 207 provides this information to the control unit. An inspection method may be any of various methods such as a method of directly reading a printed image with a camera or a scanner to inspect the printed image and a method of monitoring a condition of ejection from nozzles, instead of the method of printing the inspection pattern and scanning the inspection pattern with a scanner. In the present embodiment, presence or absence of the ejection failure is checked by the method of printing the inspection pattern and reading the printed pattern with the scanner.

The winding control unit 209 performs paper discharge control of the roll paper 111 in the paper discharge device 105.

Next, description is given of operations in the case where the image forming process is performed on the roll paper 111 in the image forming system 200. First, the user creates data of the job in the external apparatus, performs print setting of the job and setting of the number of rolls to be delivered, and transmits these pieces of information via the communication network. The control unit 204 of the image forming system 200 receives a job ticket that includes the data of the job, the print setting information of the job, the information on the number of rolls to be delivered, and the like and that is transmitted from the external apparatus, via the communication unit 203. The control unit 204 starts the printing operation based on the received information. Specifically, the control unit 204 starts the conveyance of the roll paper 111 through the paper conveyance unit 201, the paper feed control unit 208, and the winding control unit 209, and causes the printing devices 102 and 103 to perform the printing operation based on the print data.

Figure 3B:
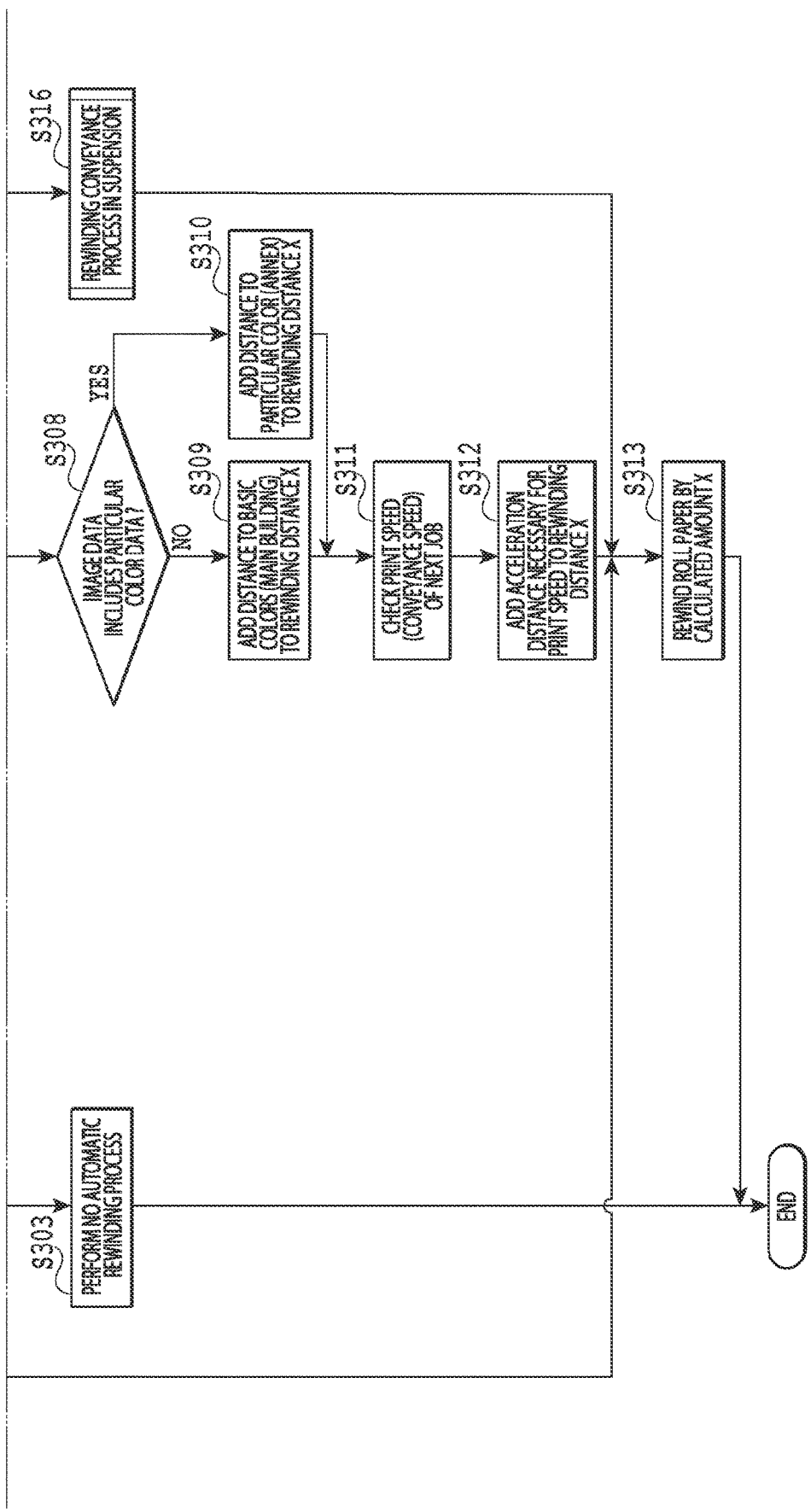
FIG. 3 is diagram showing the relationship of FIG. 3A and FIG. 3B, and FIG. 3A and FIG. 3B are flowcharts illustrating a rewinding conveyance process in printing stop.

FIG. 3A and FIG. 3B are flowcharts illustrating a rewinding conveyance process that is conveyance in a reverse direction in printing stop in the present embodiment. The CPU of the control unit 204 in the image forming apparatus 100 reads a program code stored in the storage unit 205 to load the program code on the RAM, and executes the program code to perform the series of processes illustrated in FIG. 3A and FIG. 3B. Alternatively, hardware such as an ASIC or an electronic circuit may implement functions of some or all of the steps in FIG. 3A and FIG. 3B. Note that sign "S" in the description of each process means step in this flowchart. The rewinding conveyance process in the printing stop in the present embodiment is described below by using the flowcharts of FIG. 3A and FIG. 3B. Note that, in the present embodiment, description is given of the case where take out of a printed material is not performed after completion of each job, and multiple jobs are continuously processed. Moreover, the rewinding conveyance process in the printing stop illustrated in FIG. 3A and FIG. 3B is started in the case where a print process in the image forming apparatus 100 is stopped.

In the case where the present process is started, in S301, the CPU sets a rewinding distance X to 0. Then, the CPU proceeds to S314, and determines whether or not the printing has been suspended in middle of the job (performs job suspension determination). In the case where the printing has been suspended in middle of the job, the CPU executes the rewinding conveyance process in suspension (S316) to be described later in FIG. 4. In the case where the printing has not been suspended in middle of the job, the CPU proceeds to S302, and determines whether an automatic rewinding process setting is ON or not. In the present embodiment, the user can set whether to perform automatic rewinding in the printing stop or not in advance. In the case where the automatic rewinding process setting is ON (Yes), the CPU proceeds to S304. In the case where the automatic rewinding process setting is not ON (No), the CPU proceeds to S303. In the case where the CPU proceeds to S303, in S303, the CPU determines that an automatic rewinding process is not performed (sets the rewinding distance X to 0), and terminates the present process.

In the case where the CPU proceeds from S302 to S304, in S304, the CPU determines whether the next job is inputted or not. In the case where the next job is not inputted (No), the CPU proceeds to S315, and adds, to the rewinding distance X, a distance to the annex 116 in which the printing is performed in the particular color other than the basic colors and an acceleration distance necessary to achieve conveyance speed suitable for printing. After the rewinding distance setting is performed as described above, in S313, the CPU instructs the paper conveyance unit 201, the paper feed control unit 208, and the winding control unit 209 to perform rewinding of the calculated rewinding distance X.

Performing such processing can return a trailing edge of a printed image of a previous job to a position where the particular color printing can be suitably performed. The printing can be thereby started from a position directly behind the printed image of the previous job also in the case where particular color data is inputted as the next job. In the case where the next job is the basic color printing, it is only necessary to convey the roll paper 111 to the main section 115 and then start the basic color printing. Since a blank portion in which no printing can be performed can be reduced in the roll paper 111 as described above, waste paper reduction can be achieved.

In the case where the CPU determines that the next job is inputted in S304 (Yes), the CPU proceeds to S305, and determines whether or not the inputted next job is to be on the same paper as the previous job. In the case where the CPU determines that the next job is not to be on the same paper (No), in S303, the CPU determines that the automatic rewinding process is not performed, and terminates the present process. In the case where the CPU determines that the next job is to be on the same paper in S305 (Yes), the CPU proceeds to S306, and determines whether a splice tape is included in a head portion (print starting position) of the next job. The splice tape is a tape that connects a roll paper and another roll paper (print media) to each other. Detection of presence or absence of the splice tape may be performed by a general detection method such as detection using an optical sensor or detection based on a conveyance length of the roll paper.

In the determination of S306, the CPU determines whether or not a seam portion of the roll papers are present in the head portion (print starting position) of the job and the roll papers are connected to each other by the splice tape (see FIG. 9C to be described later). Specifically, in the case where the splice tape (seam portion) is present in middle of printing instead of the head portion of the next job, the image forming apparatus 100 makes determination during the printing and performs a process such that no printing is performed in this portion. Accordingly, this portion in middle of printing is not included in a target of the determination of S306 (determination of No is made). In the case where the splice tape is present in the head portion of the next job, adjustment of the print starting position is necessary to perform printing while avoiding the splice tape in the next job. Accordingly, the determination of S306 is provided to adjust the print starting position.

In the case where the CPU determines that the splice tape is included in S306 (Yes), the CPU proceeds to S307, and subtracts a splice tape width (distance in the roll paper conveyance direction) from the rewinding distance X. This prevents rewinding to the splice tape portion, and the printing can be started from a position avoiding the splice tape. Then, the CPU proceeds to S308. In the case where the CPU determines that the splice tape is not included in S306 (No), the CPU proceeds to S308. In S308, the CPU determines whether the inputted image data includes the particular color data. The particular color data in this case refers to data of a particular color such as, for example, white ink data or fluorescent ink data that are not CMYK being the basic colors of printing. Moreover, as the input data, the particular color data is, for example, data that is inputted as layer image data different from a CMYK layer of a PDF file.

In the case where the CPU determines that the inputted image data includes the particular color data in the determination of S308 (Yes), the CPU proceeds to S310, adds, to the rewinding distance X, a distance to the printing device 103 of the annex 116 that performs the particular color printing, and proceeds to S311. In the case where the CPU determines that the inputted image data does not include the particular color data in the determination of S308 (No), the CPU proceeds to S309, adds, to the rewinding distance X, a distance to the printing device 102 of the main section 115 that performs the basic color printing, and proceeds to S311.

In the case where the CPU proceeds to S311, the CPU checks print speed (conveyance speed) registered in job setting to be described later in FIG. 7. Then, in S312, the CPU adds a necessary acceleration distance to the rewinding distance X depending on the print speed (for example, 20 m/min, 40 m/min, or 60 m/min) checked in S311. Then, as a distance setting unit, the CPU proceeds to S313, instructs the paper conveyance unit 201, the paper feed control unit 208, and the winding control unit 209 to perform rewinding conveyance of the calculated distance X, and terminates the present process.

Performing the process as described allows rewinding suitable for the next job to be performed. Specifically, rewinding of an optimal distance can be performed depending on the rewinding distance that varies due to multiple printing conditions such as whether the next job is the basic color printing or the particular color printing, how much is the print speed, and whether the splice tape is included or not. As described above, an image forming status including the multiple printing conditions is obtained from print settings, sensors, and the like, and the rewinding operation is performed based on the obtained image forming status. Performing the control of rewinding the roll paper 111 to the optimal position thus allows the printing to be started from the trailing edge of the previous print job, and waste paper can be reduced.

Figure 4:
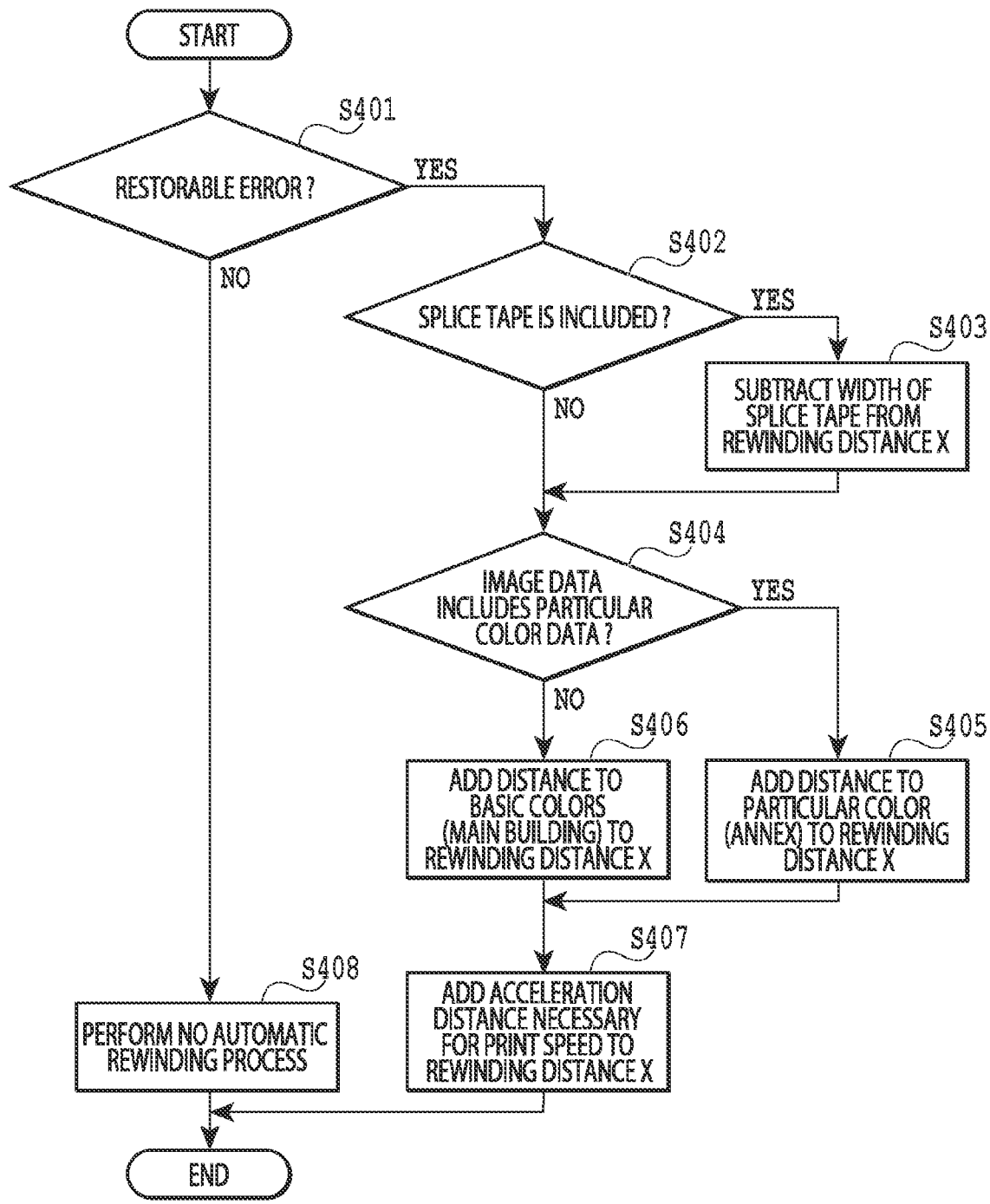
FIG. 4 is a flowchart illustrating a rewinding conveyance process in suspension.

FIG. 4 is a flowchart illustrating the rewinding conveyance process in suspension that is the process of S316 in the flowcharts of FIG. 3A and FIG. 3B. Description is given below of the rewinding conveyance process in suspension in the present embodiment by using the flowchart of FIG. 4.

In the case where the present process is started, in S401, the CPU determines whether a cause of the suspension is a restorable error or not. In this case, the restorable error is an error such as a no-paper error or a no-ink error that occurs in the case where a remaining amount of consumable becomes low, and is an error that does not require immediate stop and in which printing stop timing can be controlled. Meanwhile, an unrestorable error is an error such as a jam error that requires immediate stop of printing upon occurrence of an error event and in which the stop timing cannot be controlled. In the case where the CPU determines that the cause is the unrestorable error in the determination of S401 (No), the CPU proceeds to S408, determines not to perform the automatic rewinding process, and terminates the present process.

In the case where the CPU determines that the cause is the restorable error in the determination of S401 (Yes), the CPU proceeds to S402, and determines whether or not the paper on which the image forming is to be resumed includes the splice tape. The present process is the same process as the process of S306 in FIG. 3A, and the CPU determines whether the print starting position includes the splice tape or not. In the case where the CPU determines that the paper includes the splice tape in S402 (Yes), the CPU proceeds to S403, and subtracts the splice tape width from the rewinding distance X. This prevents the roll paper 111 from being rewound to the splice tape portion, and the printing can be started from the position avoiding the splice tape.

In the case where the CPU determines that the paper includes no splice tape in S402 (No), the CPU proceeds to S404, and determines whether or not image data whose image is to be formed after resuming in the suspended inputted image data includes the particular color data. In the case where the CPU determines that the image data includes the particular color data in the determination of S404 (Yes), the CPU proceeds to S405, and adds, to the rewinding distance X, the distance to the printing device 103 of the annex 116 that performs the particular color printing. In the case where the CPU determines that the image data includes no particular color data in the determination of S404 (No), the CPU proceeds to S406, and adds, to the rewinding distance X, the distance to the printing device 102 of the main section 115 that performs the basic color printing. Then, the CPU proceeds to S407, adds the acceleration distance necessary for the print speed to the rewinding distance X, and terminates the process.

Figure 5:
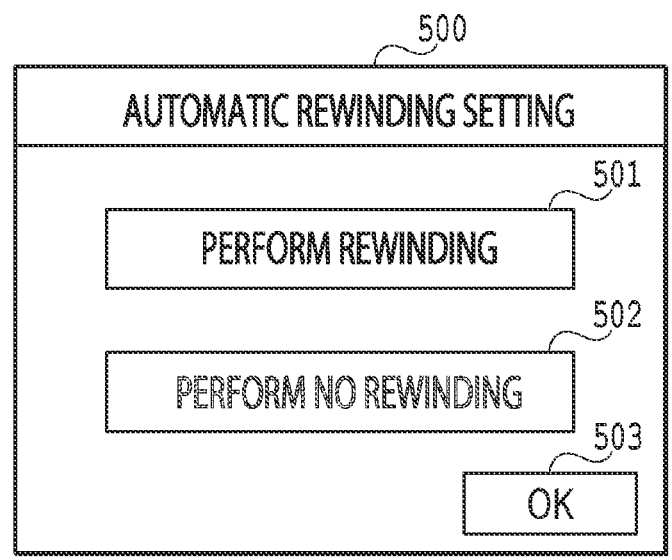
FIG. 5 is a diagram illustrating a selection screen of an automatic rewinding setting method.

FIG. 5 is a diagram illustrating a screen for selection of the automatic rewinding setting by the user, and illustrates a screen in the case where "perform automatic rewinding" is selected. In the case where the automatic rewinding is to be performed, a setting method selection screen 500 is displayed on the UI operation panel 101 of the image forming system 200, and the user performs the setting by selecting an automatic rewinding setting button 501 and pressing an OK button 503. In the case where the automatic rewinding setting is enabled, a "perform no rewinding" button 502 is grayed out. Then, the setting is reflected in the storage unit 205. In the case where the perform automatic rewinding setting is enabled at the printing stop, determination of Yes is made in S302 of FIG. 3A, and the rewinding process of the distance depending on the apparatus state is performed.

Figure 6:
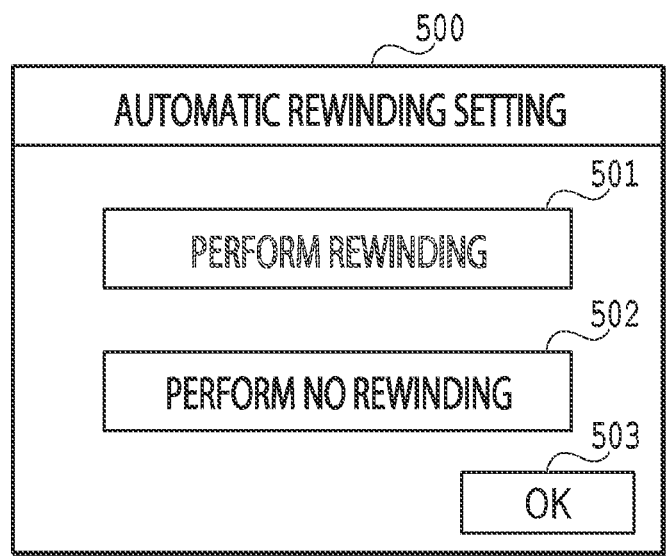
FIG. 6 is a diagram illustrating the selection screen of the automatic rewinding setting method.

FIG. 6 illustrates a screen in the case where "perform no automatic rewinding" is selected in the above selection screen 500. In the case where the automatic rewinding is not to be performed, the setting method selection screen 500 is displayed on the UI operation panel 101 of the image forming system 200, and the operator performs the setting by selecting the automatic rewinding setting button 502 and pressing the OK button 503. In the case where the perform no automatic rewinding setting is enabled, the "perform rewinding" button 501 is grayed out. Then, the setting is reflected in the storage unit 205. In the case where the perform no automatic rewinding setting is enabled at the printing stop, determination of No is made in S302 of FIG. 3A, and the automatic rewinding process is not performed.

FIG. 7 is a diagram illustrating a screen of a job list displayed on the UI operation panel 101 mounted in the image forming system 200. In this example, a unit of each line displayed in the job list 700 is assumed to be a job. Job ID: ID001, paper type: high-quality paper, paper width: 150 mm, print color: C/M/Y/K, print speed: 60 m/min, resolution: 1200 dpi, number of files: 3, number of pages 100 is assumed to be one job as a job 701. A job 702 is job ID: ID002, paper type: high-quality paper, paper width: 150 mm, print color: C/M/Y/K, print speed: 60 m/min, resolution: 1200 dpi, number of files: 2, number of pages 200. The same applies to a job 703 to a job 707.

Note that definitions of the job are not limited to the definitions of the job described in the present embodiment. For example, there are various definitions such as providing upper limits for the number of files, the number of pages, and the like in one job and handling the job 703 and the job 704 on the same paper on the list as one job, and the definitions are not limited to these. The print processes for these jobs are basically executed in the ascending order of the job ID.

Next, a method of inputting the job is described.

Figure 8:
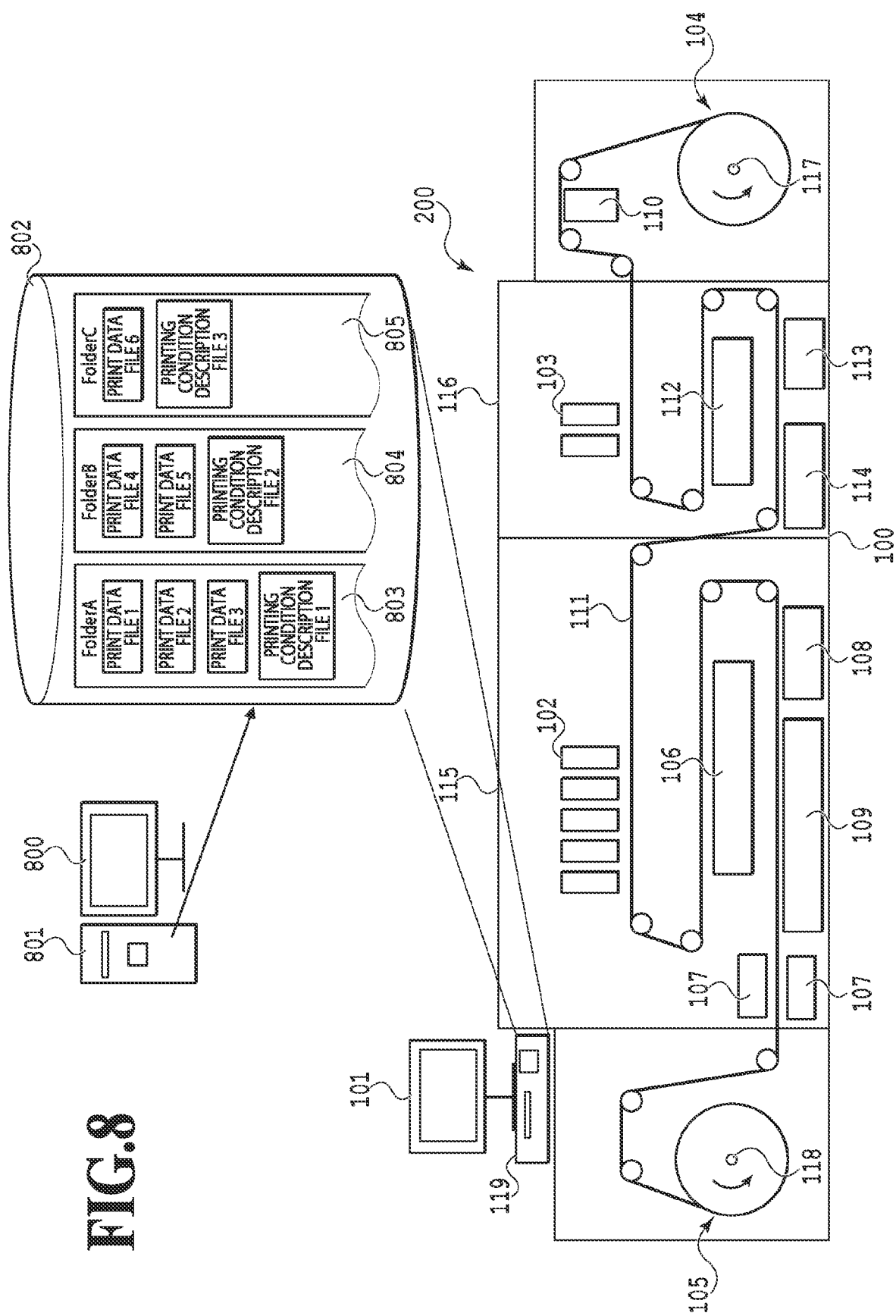
FIG. 8 is a diagram explaining a print job input method.

FIG. 8 is a diagram explaining the print job input method. The job is inputted from a print job input PC 801 into a hot folder 802 prepared in the control PC 119 of the image forming system 200. First, a folder A 803 for the job 701 illustrated in FIG. 7 is created in the hot folder 802, and three print data files and one file describing the printing conditions are inputted into the folder A 803.

Then, a folder B 804 for the job 702 illustrated in FIG. 7 is created, and two print data files and one file describing the printing conditions are inputted into the folder B 804. Furthermore, a folder C 805 for the job 703 illustrated in FIG. 7 is created, and one print data file and one file describing the printing conditions are inputted into the folder C 805.

Each of the folders are monitored in the control PC 119 of the image forming system 200, and, in the case where the control PC 119 determines that a print data file and a printing condition description file are inputted, the job list illustrated in FIG. 7 is displayed on the UI operation panel 101.

Note that the print job input method is not limited to the method described in the present example. For example, it is possible to employ various input methods such as a method of installing a driver of the image forming system 200 in the print job input PC and inputting a job or a method of inputting a job from a printer server in a cloud.

Figure 9A:
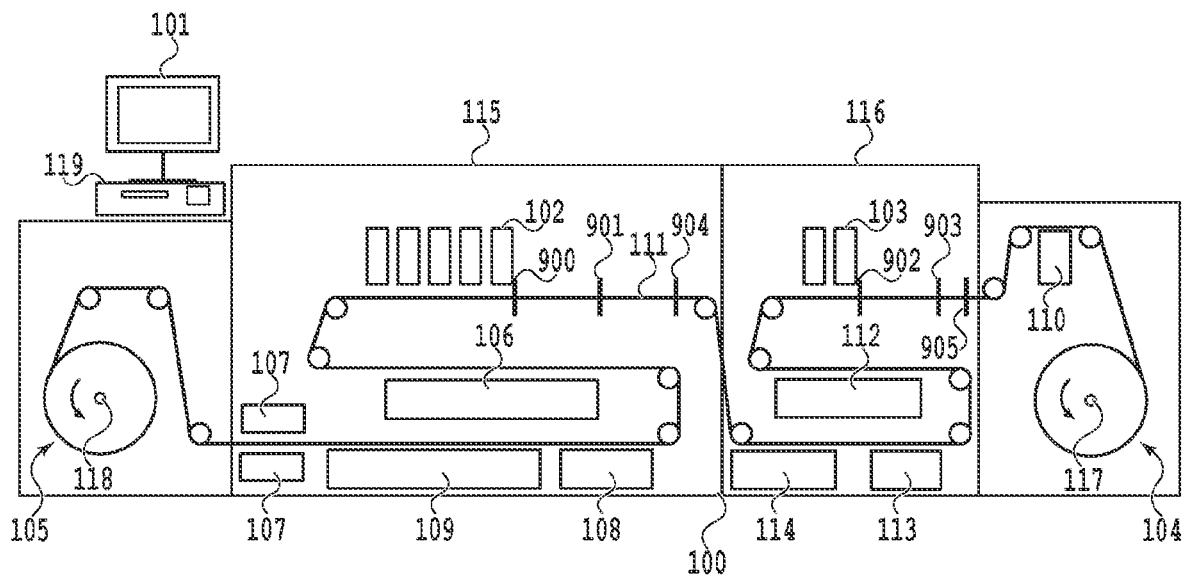
FIG. 9A is a diagram illustrating reverse rotation conveyance positions in the image forming apparatus and a roll paper.
Figure 9B:
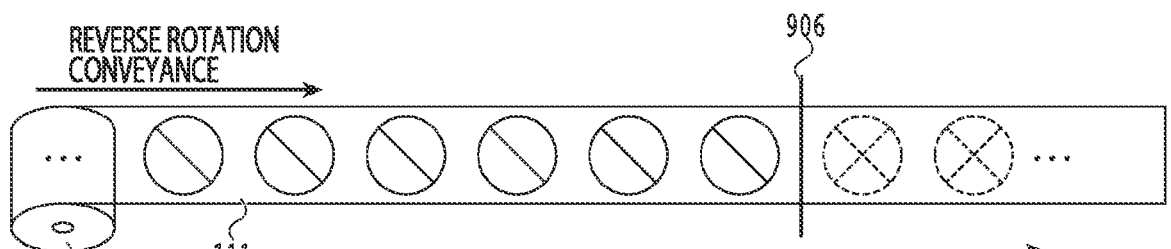
FIG. 9B is a diagram illustrating the reverse rotation conveyance positions in the image forming apparatus and the roll paper.
Figure 9C:
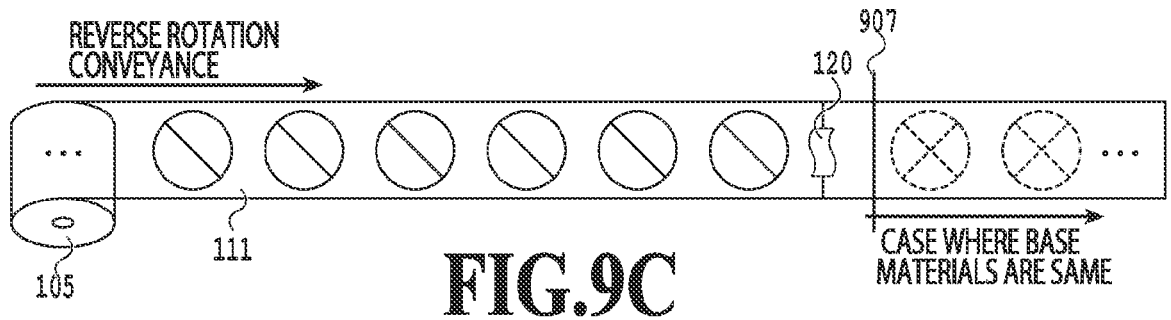
FIG. 9C is a diagram illustrating the reverse rotation conveyance positions in the image forming apparatus and the roll paper.
Figure 9D:
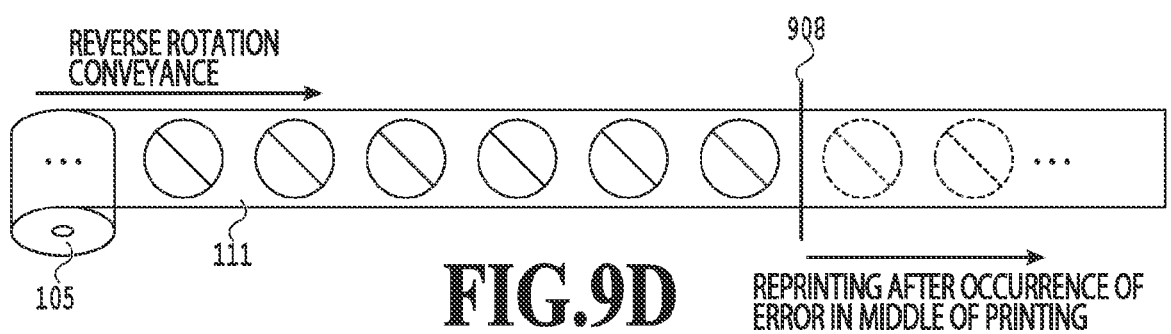
FIG. 9D is a diagram illustrating the reverse rotation conveyance positions in the image forming apparatus and the roll paper.

FIGS. 9A to 9D are a diagram illustrating a reverse rotation conveyance position (rewinding position) in the image forming apparatus 100 and diagrams illustrating the reverse rotation conveyance position in the roll paper. FIG. 9B illustrates a state where the roll paper 111 includes no connection portion formed by the splice tape, and FIG. 9C illustrates a state where the roll paper 111 includes the connection portion formed by a splice tape 160. Note that, in the roll paper 111 of FIGS. 9B to 9D, portions illustrated by solid lines on the roll paper illustrate portions where the printing has been already performed, and portions illustrated by dotted lines illustrate portions where the printing is to be performed in the next job.

For example, in the case where the CPU determines that no splice tape is included in S306 of FIG. 3A, the rewinding distance X is calculated such that a position 906 in FIG. 9B is the print starting position of the printing device 102 or 103. Meanwhile, in the case where the CPU determines that the splice tape is included in S306, the rewinding distance X is calculated such that a position 907 in FIG. 9C is the print starting position of the printing device 102 or 103.

In the case of the particular color printing by way of S310 and the print speed of 20 m/min, the rewinding distance X is calculated such that the rewinding position is a position 903 in FIG. 9A. The position 903 is a position where a suitable acceleration distance is taken into consideration such that the conveyance speed of 20 m/min is achieved at a position 902 directly behind the printing device 103. Meanwhile, in the case of the basic color printing by way of S309 of FIG. 3B and the print speed of 20 m/min, the rewinding distance X is calculated such that the rewinding position is a position 901 in FIG. 9A. In this case, the position 901 is a position where a suitable acceleration distance is taken into consideration such that the conveyance speed of 20 m/min is achieved at the position 900 directly behind the printing device 102.

In the case of the particular color printing by way of S310 of FIG. 3B and the print speed of 60 m/min, the rewinding distance X is calculated such that the rewinding position is a position 905 in FIG. 9A. Meanwhile, in the case of the basic color printing by way of S309 of FIG. 3B and the print speed of 60 m/min, the rewinding distance X is calculated such that the rewinding position is a position 904 in FIG. 9A. The positions 905 and 904 are also positions where an acceleration distance suitable for the conveyance speed of 60 m/min is taken into consideration. The print speed and the like are not limited to the speeds described in the present embodiment, and may be provided in such intervals that the speeds include, for example, 30 m/min and 40 m/min.

Next, how the control unit 204 executes reverse rotation conveyance control in the case where a job in the job list of FIG. 7 is printed is specifically described.

Description is given of the case where the printing is stopped after the printing of the job 701 in the job list of FIG. 7 and the job 702 is to be printed. The paper type and the paper width of the job 701 are high-quality paper and 150 mm, respectively, while the paper type and the paper width of the job 702 are high-quality paper and 150 mm, respectively, and the job 701 and the job 702 have the same paper type and the same paper width. Accordingly, the reverse rotation conveyance control can be automatically performed. Since the print color is C/M/Y/K and the print speed is 60 m/min in the job 702, the control unit 204 conveys the roll paper 111 in the reverse direction until the position 906 in FIG. 9B reaches the position 904 in FIG. 9A. In the reverse rotation conveyance control, in the case of conveyance to the position 901 or the position 904, the reverse rotation conveyance and stop control is performed such that on of the main conveyance rollers 120 can stop the roll paper 111 accurately at the position 901 or the position 904 while the paper feed device 104 and the paper discharge device 105 perform reverse rotation conveyance of roughly the rewinding distance X. Moreover, in the case of conveyance to the position 903 or the position 905, the reverse rotation conveyance and stop control is performed such that the other of the main conveyance rollers 120 can stop the roll paper 111 accurately at the position 903 or the position 905 while the paper feed device 104 and the paper discharge device 105 perform reverse rotation conveyance of roughly the rewinding distance X. After the conveyance in the reverse direction, the control unit 204 starts the printing of the job 702.

Next, description is given of the case where the printing is stopped after the printing of the job 702 in the job list of FIG. 7 and the job 703 is to be printed. The paper type and the paper width of the job 702 are high-quality paper and 150 mm, respectively, while the paper type and the paper width of the job 703 are film and 200 mm, respectively, and the job 702 and the job 703 vary in the paper type and the paper width. Accordingly, the reverse rotation conveyance control is not automatically performed. After completion of a process of winding a film paper of the job 703 in the winding unit, the control unit 204 executes the printing with the paper changed.

Next, description is given of the case where the printing is stopped after the printing of the job 703 in the job list of FIG. 7 and the job 704 is to be printed. The paper type and the paper width of the job 703 are film and 200 mm, respectively, while the paper type and the paper width of the job 704 are film and 200 mm, respectively, and the job 703 and the job 704 have the same paper type and the same paper width. Accordingly, the reverse rotation conveyance control is automatically performed. Since the print color is C/M/Y/K/W and the print speed is 20 m/min, the control unit 204 conveys the roll paper 111 in the reverse direction until the position 906 in FIG. 9B reaches the position 903 in FIG. 9A. After the conveyance in the reverse direction, the control unit 204 starts the printing of the job 704.

Next, description is given of the case where the printing is stopped after the printing of the job 704 in the job list of FIG. 7 and the job 705 is to be printed. The paper type and the paper width of the job 704 are film and 200 mm, respectively, while the paper type and the paper width of the job 705 are film and 200 mm, respectively, and the job 704 and the job 705 have the same paper type and the same paper width. Accordingly, the reverse rotation conveyance control can be automatically performed. Since the print color is C/M/Y/K and the print speed is 20 m/min, in the case of printing resuming in the printing device 102, the control unit 204 conveys the roll paper 111 in the reverse direction until the position 906 in FIG. 9B reaches the position 901 in FIG. 9A. After the conveyance in the reverse direction, the control unit 204 starts the printing of the job 705.

Next, description is given of the case where the printing is stopped after the printing of the job 705 in the job list of FIG. 7 and the job 706 is to be printed. The paper type and the paper width of the job 705 are film and 200 mm, respectively, while the paper type and the paper width of the job 706 are PET and 200 mm, respectively, and the job 705 and the job 706 vary in the paper type and the paper width. Accordingly, the control unit 204 does not automatically perform the reverse rotation conveyance control.

Next, description is given of the case where the printing is stopped after the printing of the job 706 in the job list of FIG. 7 and the job 707 is to be printed. The paper type and the paper width of the job 706 are PET and 200 mm, respectively, while the paper type and the paper width of the job 707 are plain paper and 300 mm, respectively, and the job 706 and the job 707 vary in the paper type and the paper width. Accordingly, the control unit 204 does not automatically perform the reverse rotation conveyance control.

Description is given of the case where the paper runs out during the printing of the job 703 in the job list in FIG. 7 and a new paper is connected to the paper with the splice tape, as an example. The paper type and the paper width of the job 703 are film and 200 mm, respectively, while the paper type and the paper width of the job 704 are film and 200 mm, respectively. Since the job 703 and the job 704 have the same paper type and the same paper width, the reverse rotation conveyance control is automatically performed. Since the print color is C/M/Y/K/W and the print speed is 20 m/min, in the case of printing resuming in the printing device 103, the control unit 204 conveys the roll paper 111 in the reverse direction until the position 907 in FIG. 9C reaches the position 903 in FIG. 9A. After the conveyance in the reverse direction, the control unit 204 starts printing of the job 704.

Furthermore, description is given of the case where a no-ink error occurs during the printing of the job 702 in the job list of FIG. 7, as another example. After the occurrence of the no-ink error, the control unit 204 stops the printing operation at a suitable position, and winds the roll paper 111 with the paper discharge device 105 to cause a portion of the roll paper 111 up to the last printed image to pass through the drying device 106 and the cooling devices 108 and 109. Since the print color of the job 702 is C/M/Y/K and the print speed is 60 m/min, the roll paper 111 is conveyed in the reverse direction such that the position 908 in FIG. 9D comes to the position 904 in FIG. 9A. After the conveyance in the reverse direction and ink tank replacement, the control unit 204 resumes printing of the job 702. The position of printing resuming in the present example is as follows. In any of the patterns of FIGS. 9B, 9C, and 9D, rewinding to a position behind (position 906, position 907, or position 908) the last printed image is performed before the rewinding, and the printing is resumed from behind the last printed image. Specifically, the printing is resumed from a region on the paper feed device 104 side of a region where the image is printed on the roll paper 111. Note that this does not mean that the roll paper is rewound to the middle of the image printed before the rewinding and the printing is resumed from middle of the printed image such as printing of an image on the printed image or insertion of an image between the printed images.

The control method of the reverse rotation conveyance after the printing stop is not limited to the method described in the present embodiment. For example, after occurrence of an error, whether to perform the reverse rotation conveyance or not may be controlled depending on the type of the error.

As described above, after the printing stop by the image forming device, a printing status (image forming status) at the start of printing is obtained, and the rewinding distance of the roll paper is set based on the obtained printing status. Then, the paper conveyance unit performs the rewinding conveyance (reverse rotation conveyance) based on the set rewinding distance. A control method of an image forming device and a program that can suppress occurrence of a wasteful operation and perform a rewinding operation of an optimal amount can be thereby provided.

Second Embodiment

A second embodiment of the present invention is described below with reference to the drawings. Incidentally, a characteristic configuration is described below because a basic configuration of the present embodiment is the same as that of the first embodiment.

Figure 10:
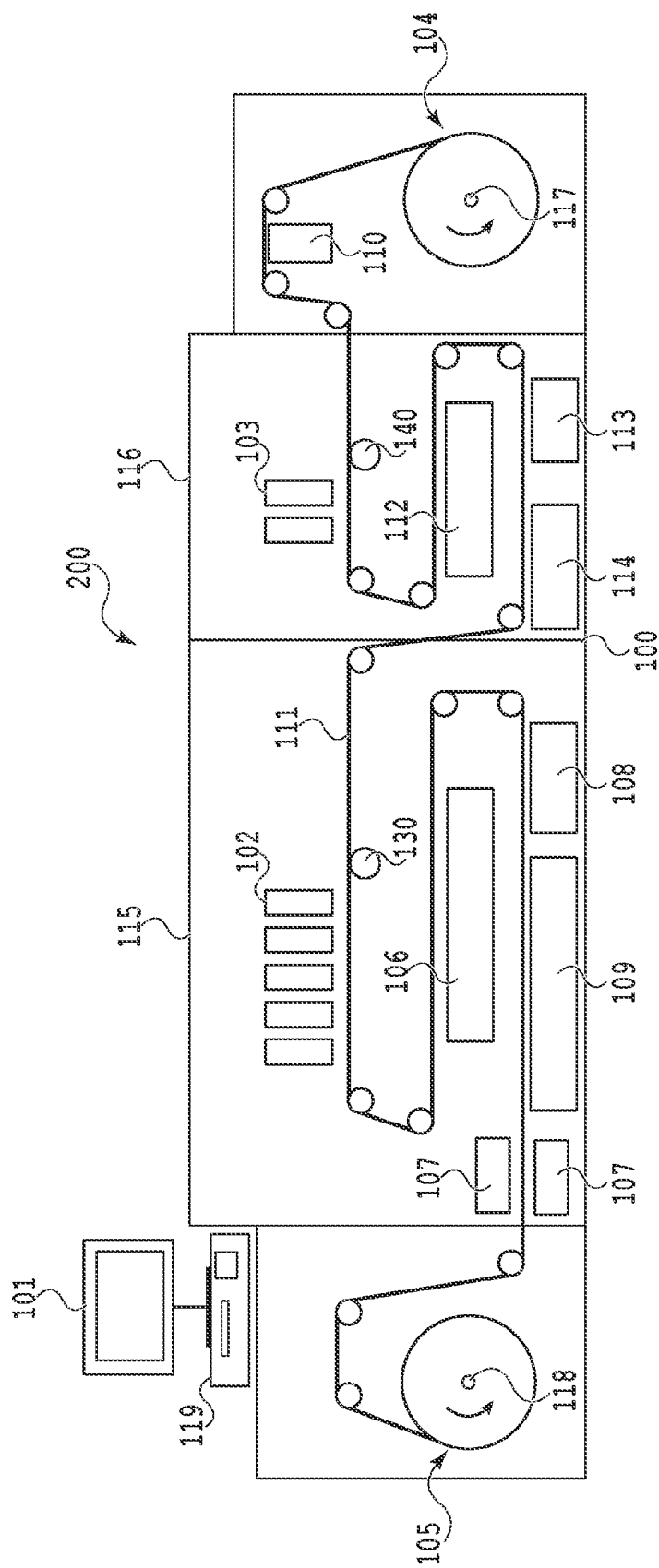
FIG. 10 is a diagram illustrating an example of the apparatus configuration of the image forming system.

FIG. 10 is a diagram illustrating an example of an apparatus configuration of the image forming system 200 according to the present embodiment. In the present embodiment, the main section 115 of the image forming apparatus 100 comprises a main conveyance roller 130, and the annex 116 of the image forming apparatus 100 comprises a main conveyance roller 140. The main conveyance roller 130 and the main conveyance roller 140 have drive sources. The main conveyance roller 130 performs conveyance control in printing of the printing device 103 (CMYK print). The main conveyance roller 140 performs conveyance control in printing of print control (printing of a particular color such as white). The main conveyance roller 130 and the main conveyance roller 140 have the drive sources so as to enable accurate conveyance in printing.

Figure 11:
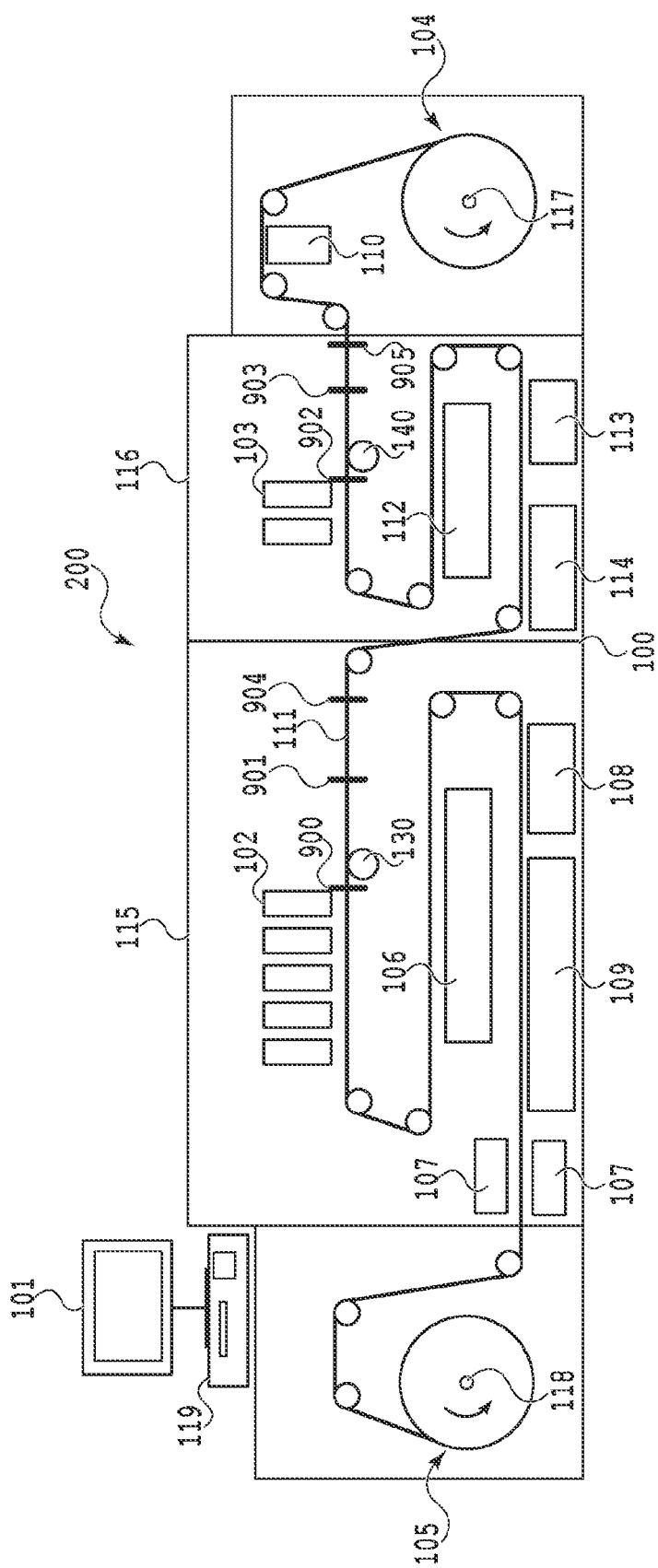
FIG. 11 is a diagram illustrating the reverse rotation conveyance positions (rewinding positions) in the image forming apparatus.

FIG. 11 is a diagram illustrating a reverse rotation conveyance position (rewinding position) in the image forming apparatus 100 of the present embodiment. In the reverse rotation conveyance control, in the case of conveyance to the position 901 or the position 904, the reverse rotation conveyance and stop control is performed such that the main conveyance roller 130 can stop the roll paper 111 accurately at the position 901 or the position 904 while the paper feed device 104 and the paper discharge device 105 perform reverse rotation conveyance of roughly the rewinding distance X. Moreover, in the case of conveyance to the position 903 or the position 905, the reverse rotation conveyance and stop control is performed such that the main conveyance roller 140 can stop the roll paper 111 accurately at the position 903 or the position 905 while the paper feed device 104 and the paper discharge device 105 perform reverse rotation conveyance of roughly the rewinding distance X.

Figure 12A:
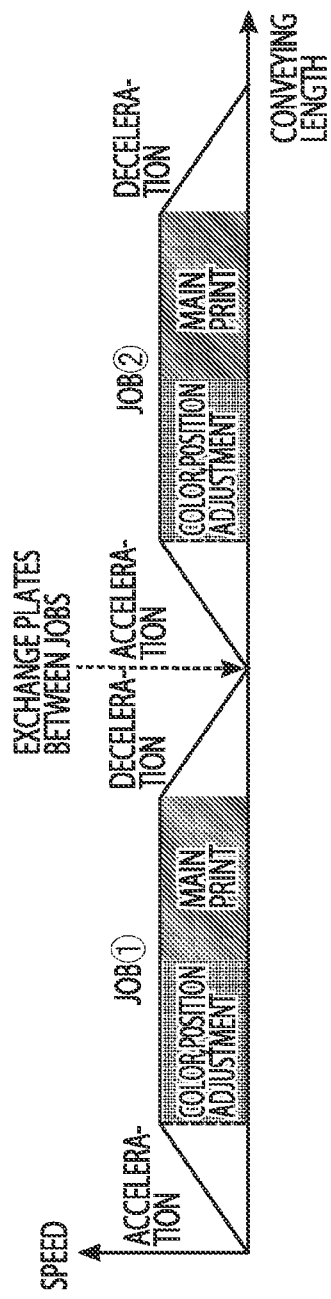
FIGS. 12A and 12B are diagrams illustrating the relation between a conveyance length and conveyance speed of a conventional printing apparatus and a finished product.
Figure 12B:
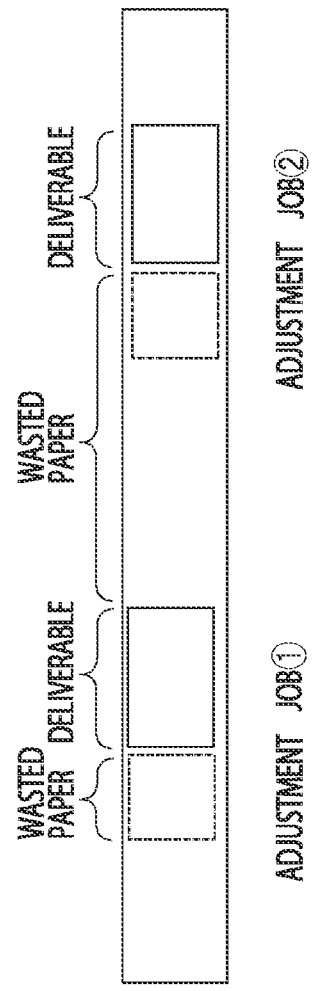

FIG. 12A is a diagram illustrating the relation between a conveyance length of paper and conveyance speed of paper in a conventional printing apparatus, and FIG. 12B is a diagram illustrating a finished product in the conventional printing apparatus. As illustrated in FIG. 12A, in a case of a conventional printing apparatus performing printing by performing a transfer with an original plate, it is necessary to replace the original plate between jobs (job1 and job2), and the adjustment of a color and a position is necessary for each replacement of the original plate. Waste paper occurs because conveyance is performed between the adjustment of the color and the adjustment of the position.

Further, it is necessary to stop the conveyance between the jobs (job1 and job2) in order to replace the original plate, and the deceleration and acceleration of the conveyance speed is necessary for each replacement of the original plate. Between the deceleration and acceleration of the conveyance speed, printing cannot be performed because the conveyance speed is not suitable. As a result, waste paper also occurs between the deceleration and acceleration of the conveyance speed.

As described above, in the conventional printing apparatus, as illustrated in FIG. 12B, waste paper caused by the adjustment of the color and the position and waste paper caused by the deceleration and the acceleration of the conveyance speed occur.

Figure 13A:
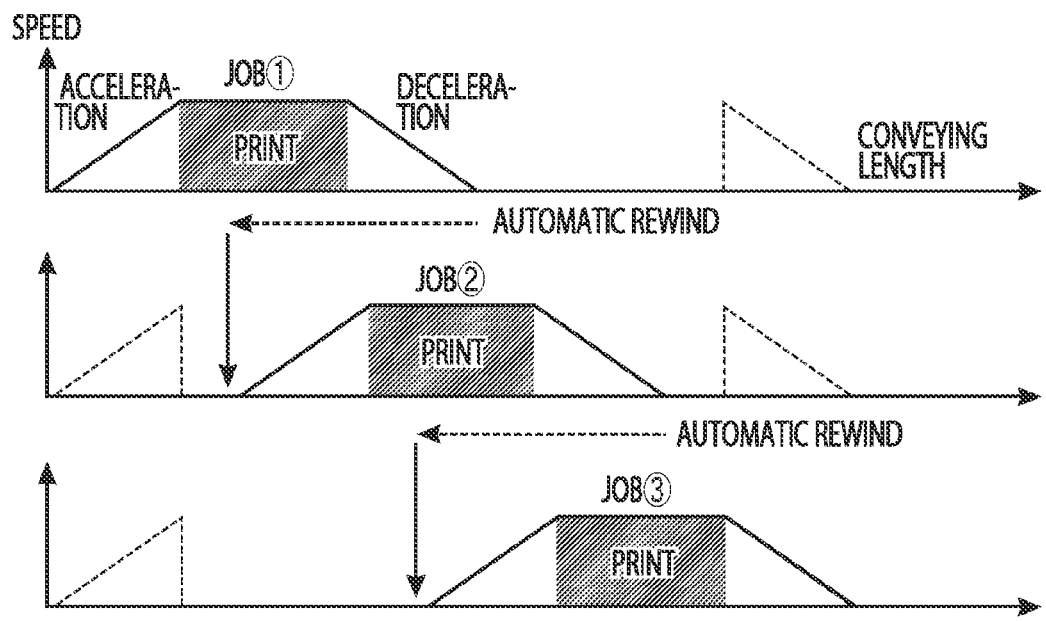
FIGS. 13A and 13B are diagrams illustrating the relation between a conveyance length and conveyance speed of the image forming system and the finished product.
Figure 13B:
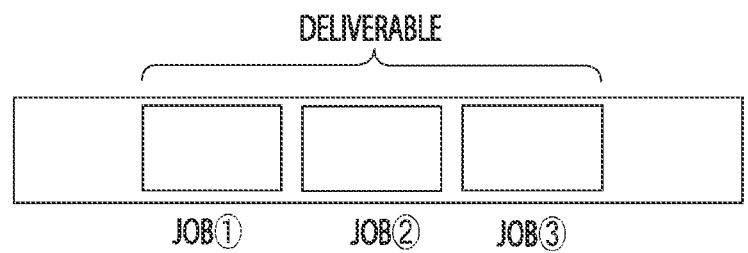

FIG. 13A is a diagram illustrating the relation between a conveyance length of paper and conveyance speed of paper in the image forming system 200 according to the present embodiment, and FIG. 13B is a diagram illustrating a finished product in the image forming system 200 according to the present embodiment. The replacement of the original plate is unnecessary in an ink jet printing method used in the image forming system 200, and thus the adjustment of the color and the position is also unnecessary. Further, performing the reverse rotation conveyance control as in FIG. 13A makes rewinding of an optimal amount possible, and thus waste paper occurring between the deceleration and the acceleration of the conveyance speed can be prevented. Consequently, the finished product can be continuously arranged on paper as illustrated in FIG. 13B, and the occurrence of waste paper can be inhibited.

Incidentally, even in a case where multiple jobs are not performed continuously such as a case where an apparatus is made to stop once and printing is resumed after the stop, the finished product can be continuously arranged on paper, and the occurrence of waste paper can be inhibited.

As described above, the present embodiment comprises the main conveyance roller 130 and the main conveyance roller 140 which have the drive sources, a printing status at the start of printing (at the time when the image forming operation is resumed) after the printing stop by the image forming device is obtained, and the rewinding distance of the roll paper is set based on the obtained printing status. A control method of an image forming apparatus and a program that can suppress occurrence of a wasteful operation and perform a rewinding operation of an optimal amount can be thereby provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-181275 filed Nov. 11, 2022, and No. 2023-164921 filed Sep. 27, 2023, which are hereby incorporated by reference herein in their entirety.

What is claimed is:

1. An image forming apparatus comprising:
    an image forming unit that forms an image on a print medium;
    a feeding unit that feeds the print medium in a forward direction in an image forming operation by the image forming unit and that rewinds the print medium in a reverse direction opposite to the forward direction after stop of the image forming operation;
    a control unit that controls the image forming unit and the feeding unit; and
    an obtaining unit that obtains a status at a time of resuming of the image forming operation by the image forming unit in a case in which the image forming operation by the image forming unit is stopped, wherein after the stop of the image forming operation by the image forming unit, the control unit rewinds the print medium in the reverse direction based on the status, and resumes image forming from a region on the feeding unit side of a region in which the image is formed by the image forming unit on the print medium.

2. The image forming apparatus according to claim 1, further comprising a rewinding distance setting unit that sets a rewinding distance by which the print medium is conveyed in the reverse direction based on the status obtained by the obtaining unit, wherein the control unit causes the feeding unit to perform a rewinding operation of conveying the print medium in the direction opposite to the forward direction based on the rewinding distance set by the rewinding distance setting unit.

3. The image forming apparatus according to claim 2, wherein the image forming unit performs the image forming based on an inputted job, and the obtaining unit obtains, as the information on the status, information on whether stop of the image forming operation by the image forming unit is stop in middle of the job or not.

4. The image forming apparatus according to claim 3, wherein, in the case in which the stop is the stop in middle of the job, the control unit determines whether to cause the feeding unit to perform the rewinding operation or not.

5. The image forming apparatus according to claim 4, wherein, in the case in which the control unit determines not to perform the rewinding operation, the rewinding distance setting unit sets the rewinding distance to 0.

6. The image forming apparatus according to claim 3, wherein, in the case in which the image forming unit performs the image forming operation for a first job, the obtaining unit obtains information on whether a second job for which the image forming operation is to be performed following the first job is inputted or not.

7. The image forming apparatus according to claim 6, wherein the obtaining unit obtains, as the information on the status, information on whether a print medium in the second job is the same as a print medium in the first job or not.

8. The image forming apparatus according to claim 7, wherein, in the case in which the print medium in the second job is not the same as the print medium in the first job, the rewinding distance setting unit sets the rewinding distance to 0.

9. The image forming apparatus according to claim 6, wherein the image forming unit includes a first image forming unit and a second image forming unit arranged upstream of the first image forming unit with respect to the forward direction, and the obtaining unit obtains, as the information on the status, information on whether or not image forming of the second job includes image forming by the second image forming unit.

10. The image forming apparatus according to claim 9, wherein the first image forming unit performs image forming in basic colors of CMYK, and the second image forming unit performs image forming in a particular color other than the basic colors.

11. The image forming apparatus according to claim 9, wherein, in the case in which the second job is not inputted, the rewinding distance setting unit sets the rewinding distance such that a position of the print medium where next image forming is to be started is a position where the image forming operation by the second image forming unit is possible.

12. The image forming apparatus according to claim 6, wherein the obtaining unit obtains, as the information on the status, conveyance speed in image forming of the second job.

13. The image forming apparatus according to claim 1, wherein the obtaining unit obtains, as the information on the status, information on whether or not a splice tape for connecting print media to each other is present at a position where the image forming unit is to resume the image forming operation.

14. The image forming apparatus according to claim 1, further comprising:

a winding unit that winds the print medium fed by the feeding unit; and a conveyance unit that conveys the print medium between the feeding unit and the winding unit.

15. The image forming apparatus according to claim 1, wherein the image forming unit includes a first image forming unit and a second image forming unit arranged upstream of the first image forming unit with respect to the forward direction, and a drying device that dries the print medium is arranged between the first image forming unit and the second image forming unit.

16. A control method of an image forming apparatus comprising:

an image forming step of forming an image on a print medium;

a conveyance step of conveying the print medium in a forward direction in an image forming operation in the image forming step and rewinding the print medium in a reverse direction opposite to the forward direction after stop of the image forming operation;

a control step of controlling the image forming step and the conveyance step; and an obtaining step of obtaining a status at a time of resuming of the image forming operation in the image forming step in a case in which the image forming operation in the image forming step is stopped, wherein in the control step, after the stop of the image forming operation in the image forming step, a rewinding distance by which the print medium is rewound in the reverse direction is set based on the status.

17. A computer-readable non-transitory storage medium storing a program that causes a computer execute:

an image forming step of forming an image on a print medium;

a conveyance step of conveying the print medium in a forward direction in an image forming operation in the image forming step and rewinding the print medium in a reverse direction opposite to the forward direction after stop of the image forming operation;

a control step of controlling the image forming step and the conveyance step; and an obtaining step of obtaining a status at a time of resuming of the image forming operation in the image forming step in a case in which the image forming operation in the image forming step is stopped, wherein in the control step, after the stop of the image forming operation in the image forming step, a rewinding distance by which the print medium is rewound in the reverse direction is set based on the status.

\* \* \* \* \*